INVENTOR
WILLIAM E. HOTCHKISS

Nov. 5, 1963

W. E. HOTCHKISS 3,109,873

GAS ABSORPTION APPARATUS

Filed Sept. 8, 1959

INVENTOR
WILLIAM E. HOTCHKISS

BY John H. Widdowson

ATTORNEY

Nov. 5, 1963 W. E. HOTCHKISS 3,109,873
GAS ABSORPTION APPARATUS
Filed Sept. 8, 1959 3 Sheets-Sheet 3
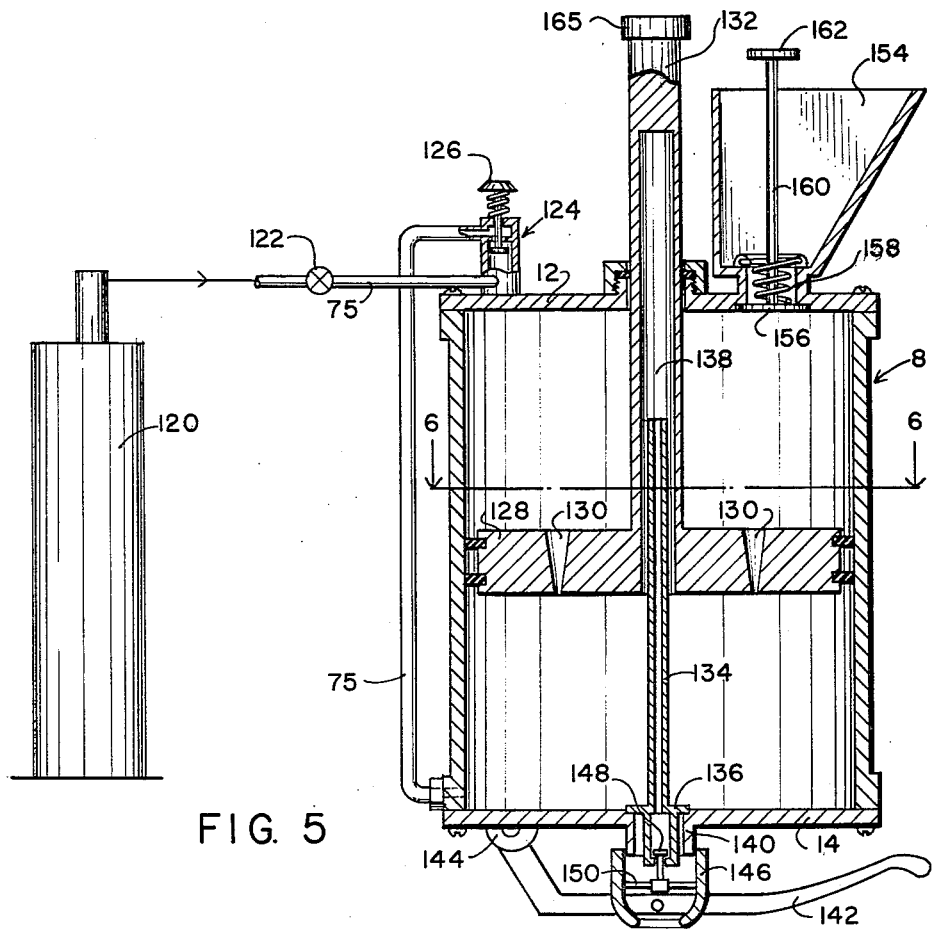
FIG. 5
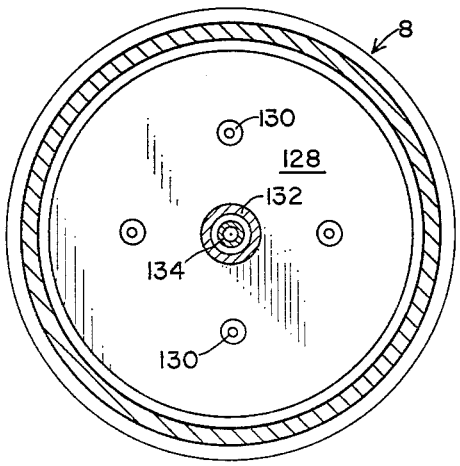
FIG. 6
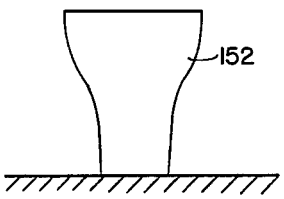
INVENTOR
WILLIAM E. HOTCHKISS
BY John H. Williamson
ATTORNEY

United States Patent Office 3,109,873
Patented Nov. 5, 1963

3,109,873
GAS ABSORPTION APPARATUS
William E. Hotchkiss, 200 N. Broadway, Wichita, Kans.
Filed Sept. 8, 1959, Ser. No. 838,540
11 Claims. (Cl. 261—35)

This invention relates to contacting gaseous fluids and liquid fluids. In a more specific aspect this invention relates to means for such contacting. In still a more specific aspect, this invention relates to contacting gaseous fluids and liquid fluids and the means or apparatus for doing such, especially such contact being done in gas absorption relation between the gaseous fluids and liquid fluids. Yet a more specific aspect of this invention relates to carbonation, and carbonating means or apparatus, most specifically contacting water and carbon dioxide gas to produce carbonated water. And, still more specifically this invention relates to piston-type means for contacting carbon dioxide and water to produce carbonated water wherein the usual line water pressure and the usual pressure under which carbon dioxide gas is available for use is used to operate the means or apparatus employed in producing the carbonated water, such apparatus being of my invention.

Carbon dioxide gas has been known for a long time, and the fact that it can be absorbed by water to produce a carbon dioxide gasified solution known as carbonated water. This carbonated water is most commonly used to mix beverages for consumption, particularly fruit flavored or cola beverages, containing or not containing sugar, alcohol, coloring, etc. Apparatus has also been known for a long time to produce such carbonated water, but the apparatus known to the art is very cumbersome, expensive to manufacture and maintain, and not reliable in operation without constant attention, and none of the apparatus of the prior art utilizes the usual water line pressure and the usual carbon dioxide gas pressure in the manner of the apparatus of my invention, and to my knowledge there never has been carbonating apparatus employing the principles of a piston with a rod moving in operation within a cylinder, such cylinder providing the contacting as well as the storing space for the carbonated water produced.

The new gas absorption apparatus of my invention is particularly suitably employed for producing carbonated water by contacting carbon dioxide and water, and this new apparatus of my invention is very advantageous, because it is small in size, taking up little space, simple and economic in structure to make it inexpensive to manufacture and install, reliable in service, requiring little or no maintenance, and it can be made in any size to produce what I refer to as a one drink amount of carbonated water or a relatively large quantity of carbonated water in one cycle of operation. The new carbonating apparatus of my invention is very versatile, lending itself to all the practical requirements of the food and drink service industries, including lodging operations such as hotels and motels. In preferred specific embodiments, I have adapted the new carbonating apparatus of my invention into inventive apparatus to produce one drink quantities of carbonated water automatically for dispensing into a drink glass at such as a soda fountain, bar, and the like, and these single measured drink systems lend themselves very advantageously to coin operated vending machines, making it unnecessary to employ the usual devices for measuring carbonated water in proper amounts. In another preferred specific embodiment, I have developed with my new invention, apparatus wherein a measured glass or other container of water can be carbonated by pouring same into the apparatus, and with in admixture other ingredients of a beverage such as fruit flavoring and sugar, alcohol, etc. Also, this last mentioned embodiment can be used to just prepare a measured glass or container of carbonated water. Another preferred apparatus of my invention embodies a cooperating combination wherein a supply tank of carbonated water which is float controlled is serviced automatically by a preferred specific embodiment of my carbonating apparatus, such cooperating combination of apparatus being most desirable for use in a soda fountain or bar installation wherein a multitude of carbonated water delivery lines and taps are utilized, or wherein it is desired to install a main supply source for carbonated water in such as a club, hotel, motel, office building, home, and the like. In all these embodiments and installations, the new apparatus of my invention for carbonating is ideal from a manufacturing, installing and servicing standpoint.

The new apparatus for contacting liquid fluid and gaseous fluid of my invention employs a cylinder. A piston having a passageway therethrough is operably mounted in the cylinder, and the piston rod therefor is operatively connected to the piston. In the head end portion of the cylinder is provided valve controlled outlet means for withdrawing resulting liquid having gas absorbed therein, such resulting from operation of the new apparatus of my invention. In the head end portion of the cylinder is provided valve controlled inlet gaseous fluid means for introducing thereinto the gaseous fluid to be contacted with the liquid fluid for absorption operation. The liquid fluid is introduced into the rod end portion of the cylinder through inlet valve means therefor in the rod end portion. The passageway in the piston in operation provides communication between the rod end chamber of the cylinder and the head end chamber of the cylinder to provide for and result in contact of liquid fluid and gaseous fluid during operation. This passageway is controlled by valve means to provide for opening and closing the passageway in different stages of the cycle of operation. The cylinder is preferably provided with valve controlled venting means to vent same to atmospheric pressure after producing therein the liquid having gas absorbed.

The new apparatus for contacting liquid fluid and gaseous fluid of my invention is constructed and operable to receive liquid fluid in the rod end chamber of the cylinder, to receive gaseous fluid in the head end chamber of the cylinder to extend the piston therein and thereby pass the liquid fluid from the rod end chamber through the passageway in the piston into the head end chamber in liquid gas contacting relation. And also, the apparatus is constructed and operable to provide for venting the cylinder to the atmosphere after production of the gasified liquid, this permitting withdrawal of the resulting gasified liquid fluid of the cylinder through the outlet means in the head end chamber of the cylinder.

It is an object of my invention to provide new means or apparatus for contacting gaseous fluids and liquid fluids.

Another object of my invention is to provide new means for making carbonated water.

Still a further object of my invention is to provide new means for making carbonated water wherein the usual pressure on the water line and the usual pressure on the carbon dioxide supply source is utilized in piston-type contacting apparatus to produce carbonated water.

Yet another object of my invention is to provide new water carbonating means which is compact, easy and economical to manufacture, install, service, versatile to provide for automatic operation, one drink carbonation of a measured quantity of water, and carbonation to supply automatically a storage and supply system to either one or a plurality of lines and/or taps.

Other objects and advantages of the new apparatus for contacting liquid fluid and gaseous fluid of my invention will become apparent to those skilled in the art upon reading this disclosure.

Drawings accompany and are a part of this disclosure. These drawings depict preferred specific embodiments of the new apparatus for contacting liquid fluid and gaseous fluid of my invention, and it is to be understood that the drawings are not to unduly limit the scope of my invention.

In the drawings,

FIG. 5 is a longitudinal view, partly in cross section and partly cut away, of a preferred specific embodiment of the carbonating apparatus of my invention, preferably employed to carbonate a measured amount of water or drink from a glass or other container.

FIG. 6 is a view taken on line 6—6 of FIG. 5.

Figure 1:
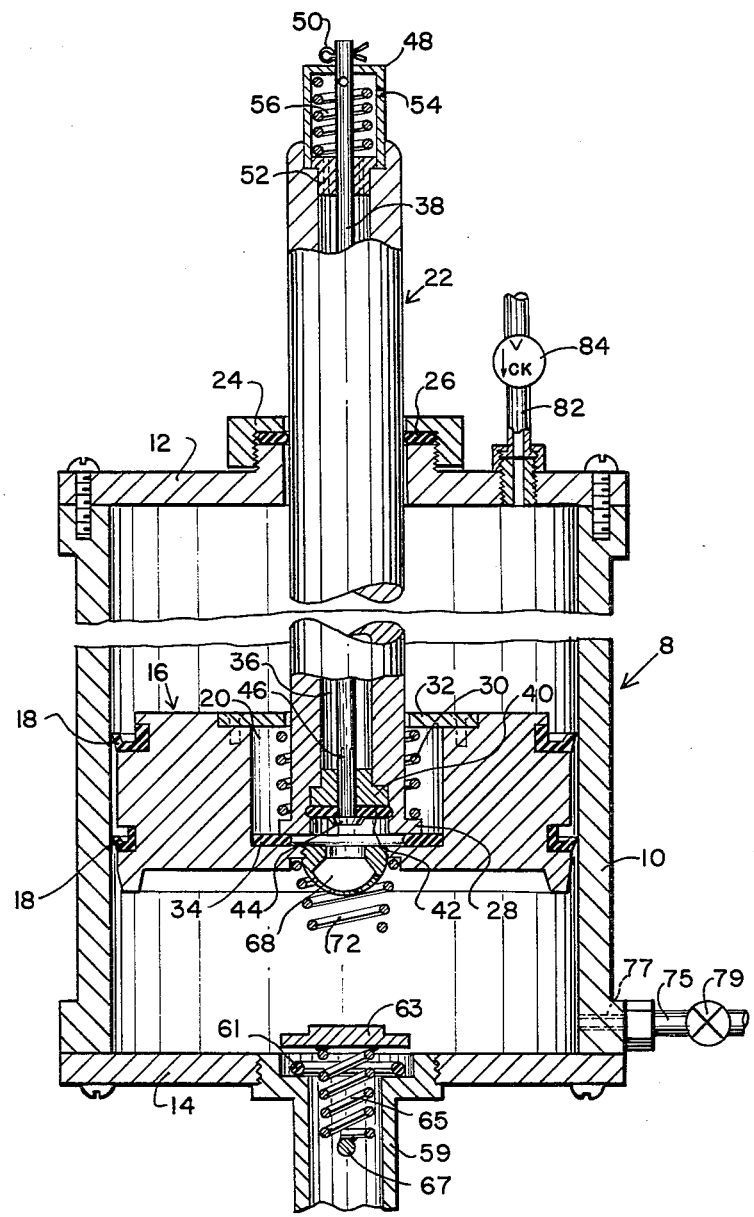
FIG. 1 is a longitudinal view, partly in cross section and partly cut away, of a preferred specific embodiment of the new apparatus of my invention for contacting liquid fluid and gaseous fluid, particularly desirably employed to produce carbonated water from contacting water and carbon dioxide.

In the following is a discussion and description of the new apparatus of my invention for contacting liquid fluid and gaseous fluid. Such discussion and description is in relation to my new apparatus as preferably employed to make carbonated water, and reference is made to the drawings whereon the same reference numerals are used to indicate the same or similar parts and/or structure. The discussion and description is of preferred specific embodiments of my invention, and it is to be understood that such is not to unduly limit the scope of my invention.

Figure 2:
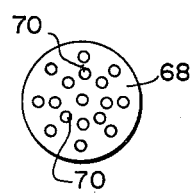
FIG. 2 is a plan view of the nozzle mounted in and on the piston of the apparatus of FIG. 1 on the cylinder head and side thereof.

Referring now to the drawings, FIGS. 1 and 2 specifically, therein is depicted a preferred specific embodiment of the new apparatus of my invention for contacting liquid fluid and gaseous fluid which is a design preferably used in making carbonated water. The apparatus has a closed cylinder 8 made of any suitable material, preferably metal, and it is designed strengthwise to stand the pressure of the usual carbon dioxide gas supply. The cylinder 8 has side walls 10, rod end 12 and head end 14.

A piston 16, constructed of any suitable material, is reciprocably mounted in the cylinder 8 for operation, and the piston preferably has seal rings 18 mounted therearound to seal against fluid communication between the head end chamber of the cylinder 8 and the rod end chamber of the cylinder 8. A passageway 20 through piston 16 is provided, such passageway 20 providing for communication between the rod end chamber and the head end chamber of cylinder 8 during one stage of operation of the apparatus.

A hollow piston rod 22 is operatively attached to piston 16, such rod 22 projecting out the rod end 12 of cylinder 8, preferably being mounted by nut means 24 and packing 26 therearound, to prevent communication between the inside of cylinder 8 and the atmosphere around rod 22. The inner end of piston rod 22 is preferably within passageway 20 in piston 16, forming therewith an annular passageway which is communicatable between the head end and rod end chambers of cylinder 8 during one stage of a cycle of operation. This mounting within piston 16 is preferably accomplished as shown in FIG. 1 of the drawings. The lower end or inner end of rod 22 has a flange 28. A helical spring 30, acting in compression, contacts the flange portion 28 of rod 22 and a mounting plate member 32 which covers the passageway 20 on the rod end side of piston 16. This plate 32 forms with rod 22 a smaller annular passageway between the hollow of piston 16 and the rod end chamber of cylinder 8, and also plate 32 provides backing for spring 30 to urge the rod 22 into extended position relative to the hollow of piston 16. The flange 28 of piston rod 22 forms a valve, and a valve seat insert 34 of suitable material is mounted in the bottom of the hollow within piston 16, against which flange portion 28 fits in valve closing position to prevent communication between the rod and chamber and the head end chamber of cylinder 8.

The hollow 36 of piston rod 22 forms a passageway to in operation of the apparatus provide for venting cylinder 8 to the atmosphere. Preferably to accomplish this a valve 38 is slidably mounted axially with passageway 36 through piston rod 22. A plug 40 and valve seat 42 of any suitable material are mounted in the inner end of the hollow 36 of rod 22, with valve 38 and head 44 thereof passing through valve seat 42 and plug 40, that is, the stem portion of valve 38 passing therethrough with the contacting portion 44 engaging seat 42 in operation. A plurality of grooves 46 are provided in the inner end of valve stem 38, so that when contacting portion 44 of the valve is out of contact with the seat 42, passageways will be provided to allow passage of fluid from cylinder 8 into the hollow 36 of rod 22. The outer end of valve stem 38 is mounted in a housing 48 which is in turn suitably mounted in the outer end portion of rod 22. Stem 38 passes therethrough and is held in any suitable manner such as by cotter key 50. The plug end or end portion 52 of housing 48 has passageways therethrough (dotted lines) and the housing has one or more holes 54 therethrough to provide for communication between the hollow 36 of rod 32 and the atmosphere. The helical spring 56, acting in compression, is mounted within housing 48 and attached to valve stem 38 to retract the valve stem and close the valve in the inner end of rod 22 with contacting member 44 against valve seat 42.

To vent the apparatus the valve stem 38 is pushed inwardly to open the valve, providing communication between the inside of cylinder 8 and the atmosphere.

An outlet conduit for carbonated water produced by the apparatus is provided in head end 14 of cylinder 8. It is preferably a valved outlet conduit. A pipe 59 for the conduit proper is preferably threadedly secured by a fitting in end 14. A seal ring valve seat 61 is mounted in the fitting. The preferably circular valve 63 is spring loaded by a helical spring 65 secured to the bottom of valve 63 in one end and to a pin 67 in the other end, such pin 67 being mounted in the conduit 59 proper. The disk-like valve 63 fits into the preferably circular valve seat in the head end portion of conduit 59 and the fitting therefor, and this type of valve is highly desirable, because it will open and close quickly from a relatively wide open position to a closed position. The helical spring 65 works in compression to urge the valve into open position (FIG. 1) for discharge of carbonated water from cylinder 8. The spring 65 is strong enough to open valve 63 against the head of carbonated water within cylinder 8, after cylinder 8 has been vented to the atmosphere through the hollow 36 of piston rod 22. Valve 63 is closed in operation, that is, the commencing of operation, by the pressure within cylinder 8 caused by the introduction thereinto of carbon dioxide into the head end chamber of cylinder 8.

A nozzle 68 having a plurality of holes 70 therein is suitably mounted in piston 16 at the outlet of passageway 20 therethrough into the head end chamber of cylinder 8. In operation, this nozzle works to spray water over a wide area into the head end chamber for good contact with carbon dioxide therein. A shock absorbing helical spring 72 is preferably mounted around the nozzle 68 to absorb the shock of the piston assembly coming into contact with valve 63 and the end 14 of cylinder 8 upon retraction of piston 16, which occurs when water is introduced into the rod end chamber of cylinder 8. Spring 72 contacts valve 63 to close same, and to hold same closed while carbon dioxide is introduced into the head end chamber.

An inlet conduit 75 is mounted in the side wall of cylinder 8 in the head end portion thereof. A plurality of passageways 77 in the side wall of cylinder 8 communicate with conduit 75 and the head end chamber of the cylinder. Valve means 79 are provided for this conduit 75 to control same. Carbon dioxide from a suitable supply source, such as a usual tank of same, is introduced into the head end chamber of cylinder 8 through this conduit 75, which is suitably connected into the carbon dioxide supply. The valve means 79 functions to shut off the carbon dioxide when the piston 16 and rod 22 have been fully extended.

An inlet conduit 82 for water is suitably mounted in end 12 of cylinder 8. A check valve 84 with this inlet conduit 82 controls water introduction into the rod end chamber of cylinder 8, and prevents water discharge from such chamber as a result of pressure build-up within cylinder 8 due to introduction of carbon dioxide thereinto through conduit 75. Conduit 82 is mounted and secured in end 12 in any suitable manner.

The hereinafter described operation of the apparatus shown in FIGURE 1 will be readily understood in the light of certain principles of operation involved. Whereas the entire cross sectional area of the piston 16 is effectively presented to the head end chamber of the cylinder 8, the effective area of the piston 16 presented to the rod end chamber of the cylinder 8 is the entire cross sectional area of the piston 16 minus the cross sectional area of the piston rod 22. Accordingly, neglecting the weight of the piston 16 and the piston rod 22 as well as the weight of fluids and frictional forces involved, static equilibrium of the piston 16 requires that the ambient pressure multiplied by the area of the piston rod 22 plus the pressure in the rod end chamber multiplied by the effective area of the piston 16 presented toward rod end chamber be equal to the pressure in the head end chamber multiplied by the effective area of the piston 16 presented toward the head end chamber.

Inasmuch as the pressure of carbon dioxide gas introduced into the head end chamber of the cylinder 8 will exceed pressure ambient to the cylinder 8 and the exposed end of the piston rod 22, the above statement of requirements for static equilibrium necessitates that a pressure in the rod end chamber of the cylinder will result such that the latter mentioned pressure will exceed the pressure prevailing in the head end chamber of the cylinder. Inasmuch as pressure in the head end chamber sufficiently in excess of ambient pressure will cause relative movement of the piston rod 22 from the piston 16 against the action of the spring 30 to open communication between the rod and head end chambers through restricted passageway means, fluid can flow from the rod end chamber to the head end chamber under the influence of a pressure differential necessitated by the previously described conditions for static equilibrium, with the result that the piston 16 will travel in a direction to enlarge the volume of the head end chamber and to reduce the volume of the rod end chamber. The resultant forces acting on the piston 16 causing such movement can greatly exceed those necessary to overcome the effects of gravity acting on the piston 16, the piston rod 22 and the fluids involved as well as to overcome the effects of friction and to accomplish external valve actuation such as presently described in connection with apparatus illustrated in FIGURE 3.

In operation, water from a usual water line under the normal pressure of from 20 to 35 pounds is introduced into cylinder 8 and the rod end chamber therein through conduit 82. This retracts piston 16 and piston rod 22, until spring 72 in contact with valve 63 is compressed to close valve 63 and to overcome the pressure of the water. At this point the water line 82 could be closed completely, but a check valve is all that is necessary to prevent flow of water back out through conduit 82. Next valve 79 is opened to pass carbon dioxide into the head end chamber of cylinder 8 through conduit 75 and passageways 77. The pressure of the carbon dioxide is relatively much greater than the water pressure, and as a result of introduction of the carbon dioxide, piston 16 is extended and valve 63 is maintained closed. The pressure of the carbon dioxide opens the valve formed by the flange 28 of piston rod 22 against the pressure of helical spring 30. Water then passes through the annular passageways between rod 22 and piston 16 and out through nozzle 68 into the head end chamber where the water in spray form contacts carbon dioxide to become carbonated. This extension of piston 16 and rod 22 continues until piston 16 is fully extended, whereupon all of the water in the rod end chamber has passed into the enlarged head end chamber, and has become carbonated. Then valve 79 is closed, either manually or automatically. The cylinder 8 is still under pressure, so valve stem 38 is pushed inwardly to raise contacting valve 44 from closed relation to valve seat 42, and cylinder 8 is vented to the atmosphere and atmospheric pressure. When the pressure has been reduced to atmospheric, helical spring 65 opens valve 63, and the carbonated water passes rapidly out of conduit 59, and without flashing the carbon dioxide absorbed. With the venting to the atmosphere and the extension of piston 16, spring 30 works to close the valve formed by flange 28 and valve 34. The apparatus can then be run through the same cycle to make another charge of carbonated water.

From the foregoing it will be apparent that vapor-liquid contacting apparatus has been illustrated and described comprising a closed cylinder, a piston mounted for reciprocation in the cylinder and separating the interior of the cylinder into first and second chambers of variable volumes, a first valve controlled means for discharging the second chamber, a piston rod means carried by the piston reducing the effective area of the piston presented to the first chamber and extending through the first chamber end of the cylinder, said piston presenting a relatively small first area to the first chamber and presenting a relatively large second area to the second chamber, a restricted passageway means extending entirely through the piston from the first chamber side to the second chamber side thereof, a second valve controlled means to supply liquid to the first chamber at a pressure in excess of ambient pressure, and a third valve controlled means to supply gas to the second chamber at a pressure in excess of ambient pressure, when the first chamber is liquid filled and expanded by piston displacement toward the second chamber and said first and second valve controlled means are closed, with the pressure of the gas supplied to the second chamber acting on the relatively large second area to raise the pressure of the liquid in the first chamber acting on the relatively small first area to a value in excess of the pressure in the second chamber, whereby liquid passes from the first chamber to the second chamber through the restricted passageway means with concurrent movement of the piston toward the first chamber.

Figure 3:
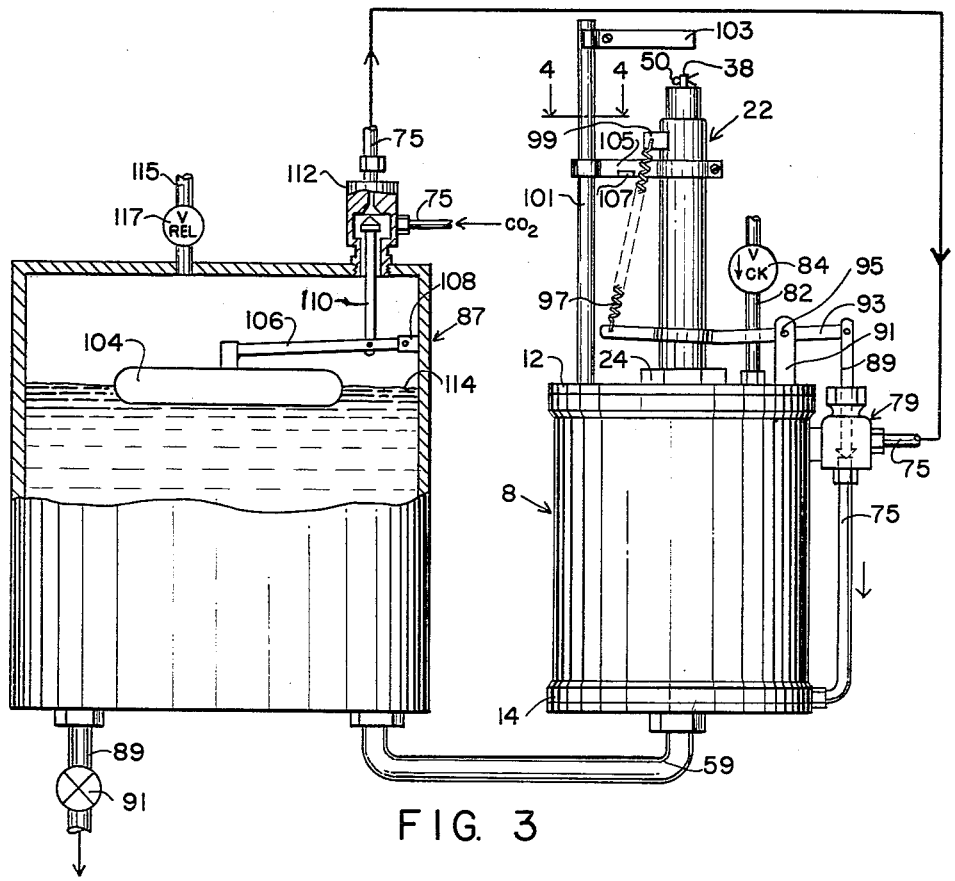
FIG. 3 is a side elevation view, partly in cross section and partly cut away of a preferred specific embodiment of my invention wherein the new preferred carbonating means of my invention is utilized in cooperating combination with the storage tank to provide for supplying a plurality of carbonated water taps in such as a hotel, motel, club, etc.
Figure 4:
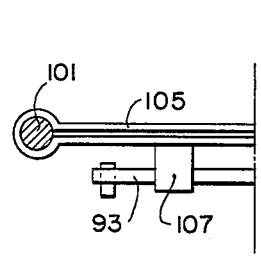
FIG. 4 is an enlarged view taken on line 4—4 of FIG. 3 to better show the operating arm means of the apparatus.

In FIG. 3 is shown a preferred specific combination apparatus of my invention utilizing the carbonating apparatus of FIG. 1 in an automatically controlled system having a supply tank 87 of carbonated water, supplying one or more taps through outlet conduit 89 having valve means 91 therein. In this preferred specific embodiment valve 79 has a valve stem 89 which operates means to open and close conduit 75. A fulcrum member 91 is suitably secured to the rod end 12 of cylinder 8, and a lever 93 is pivotally secured in one end to valve stem 89, and pivotally secured to the fulcrum 91 at point 95. To the other end of lever 93 is secured a helical spring 97. This spring 97 is secured in its other end to an arm member 99 rigidly mounted on the outer end portion of piston rod 22. When rod 22 is extended (FIG. 3), valve stem 89 is retracted to close valve 79, and shut off carbon dioxide to conduit 75 out of the valve housing and into cylinder 8. When rod 22 is retracted, valve 79 can be and is opened.

An upright member 101 is suitably mounted on rod end 12 of cylinder 8. An arm member 103 is fixedly attached to the outer end portion of upright member 101. When rod 22 is extended fully, valve stem 38 contacts arm 103 to open valve 44 to allow venting of cylinder 8 to the atmosphere.

An arm member 105 is suitably rigidly clamped to piston rod 22 to move therewith, and preferably mounted on upright 101 to be guided thereby. A projecting arm 107 is secured to arm 105, and when rod 22 is retracted, which occurs when water has been introduced into the rod end chamber of cylinder 8 through conduit 82, arm 107 contacts lever 93 to open valve 79, to introduce carbon dioxide into the head end chamber of cylinder 8.

Thus, the carbonating apparatus of FIG. 3 works completely automatic, and line pressure can be maintained on water line 82 with the use of check valve 84. The apparatus as rigged in FIG. 3 will continue to cycle and make carbonated water, and discharge same out of conduit 59 into storage tank 87. This will occur automatically, as piston 16 is retracted with valve 63 open after venting. Valve 63 will remain open during the discharge of carbonated water of cylinder 8.

A float 104 controls along with its related apparatus, the operation of the carbonating apparatus. Float 104 is suitably connected to a lever 106, which is pivotally secured by member 108 to the wall of storage tank 87. A valve stem 110 is mounted on lever 106. This valve stem operates valve 112 in carbon dioxide supply conduit 75. When the liquid level 114 in tank 87 drops float 104 (FIG. 3), valve 112 is open to supply carbon dioxide to valve 79, and the apparatus will continue to operate and cycle automatically to produce carbonated water. When the supply tank 87 is full enough, the float 104 will retract valve stem 110 to close valve 112 and shut off carbon dioxide to valve 79. This then prevents the carbonating apparatus to operate, and it will not operate until valve 112 is again open to supply carbon dioxide. A vent line 115 having a relief valve 117 therein is preferably employed in the top of storage tank 87. Some pressure is desirably maintained on storage tank 87. This has been found to maintain good carbonation.

In the drawings, FIGS. 5 and 6, is shown another preferred specific embodiment of carbonating apparatus of my invention. Substantially the same cylinder structure is desirably used as that of FIG. 1. Carbon dioxide is supplied to the head end chamber of the cylinder through conduit 75 from a common carbon dioxide supply tank 120. A manual valve 122 is preferably in conduit line 75. A button valve 124 having a finger or thumb operator 126 is preferably employed in conduit 75 to manually control introduction of carbon dioxide into cylinder 8 in the head end chamber. Piston 128 has a plurality of passageways 130 therethrough, with orifice type outlets into the head end chamber of the cylinder. A hollow piston rod 132 is attached to piston 128 to move therewith. A valve stem 134 having valve flange 136 thereon is mounted to extend into the hollow 138 of piston rod 132. Valve 136 seats into a valve seat formed in end 14 of cylinder 8 at the inlet of outlet 140 from cylinder 8, such outlet 140 delivering carbonated water produced by the apparatus. A valve operator lever 142 is pivotally secured to end 14 of cylinder 8 by mounting member 144. A housing 146 is mounted by lever 142 to ride on outlet 140. The outer end of valve stem 134 has inside thereof another valve seat, which accommodates a valve 148, which in operation seats against the inwardly turned end of valve stem 134 to prevent communication between the inside of cylinder 8 and the atmosphere. This valve 148 is opened by operator 142 lifting housing 146 to vent cylinder 8. Valve 148 is mounted in housing 146 in a suitable manner such as by pin 150. And, upon further operation and moving upwardly of lever 142 flange valve 136 is lifted from its seat to open the outlet into conduit 140, discharging carbonated water or drink into glass 152.

A hopper 154 is mounted in the rod end 12 of cylinder 8, the bottom or lower portion of hopper 154 being in communication with the rod end chamber of cylinder 8, when valve 156 is opened. Valve 156 is normally maintained closed by helical spring 158, acting in tension to pull valve 156 against its seat formed in rod end 12. Valve stem 160 operates valve 156 by pushing on the button end 162 thereof.

The principles underlying operation of the apparatus shown in FIGURE 5 are analogous to those previously set forth in connection with FIGURE 1. The piston 128 presents a relatively large effective area to the head end chamber of the cylinder 8 and a relatively small effective area to the rod end chamber of the cylinder 8, whereby a pressure in the head end chamber in excess of ambient pressure results in a relatively higher pressure in the rod end chamber so that water will flow through the restricted passageway means 130 from the rod end chamber to the head end chamber and so that the piston will move to enlarge the volume of the head end chamber and to reduce the volume of the rod end chamber.

In operation, glass 152 is filled with the desired amount of water or a beverage, such as a mixture of water and whiskey. The glass 152 is then emptied into hopper 154. With piston 128 and rod 132 retracted by pushing on the button end 165 of rod 132, valve 156 is opened, allowing the water or drink mix to flow into cylinder 8. Spring 158 then closes valve 156. Valve 124 is then opened to pass carbon dioxide through conduit 75 into the head end chamber of cylinder 8. This extends piston 128, while water passes through passageways 130 into the head end chamber in contact with carbon dioxide to carbonate same. When piston 128 has been thoroughly extended, and all the water passed into the head end chamber to become carbonated, valve 124 is closed. Upon raising lever 142, cylinder 8 is vented to the atmosphere out through the hollow of valve stem 134 and valve 148. Then upon further operating lever 142 valve 136 is lifted from its seat, opening conduit 140, and the carbonated water passes thereout into glass 152. Releasing lever 142, allows valves 148 and 136 to close and permit another cycle of operation of the apparatus to produce another measure of carbonated water or of carbonated beverage.

As will be evident to those skilled in the art, various modifications of my invention can be made, or followed in the light of this disclosure and discussion, without departing from the spirit or scope of the disclosure or from the scope of the claims.

I claim:

1. In gas-liquid contacting apparatus, structure comprising a closed cylinder, a piston mounted for reciprocation in the cylinder and separating the interior of the cylinder into first and second chambers of variable volumes, a first valve controlled means for discharging the second chamber, a piston rod means carried by the piston reducing the effective area of the piston presented to the first chamber and extending through the first chamber end of the cylinder, said piston continuously presenting a relatively small first area to the first chamber and continuously presenting a relatively large second area to the second chamber, a restricted passageway means disposed solely in and extending entirely through the piston from the first chamber side to the second chamber side thereof and affording direct fluid communication therebetween, a second valve controlled means to supply liquid to the first chamber at a pressure in excess of ambient pressure, and a third valve controlled means to supply gas directly to the second chamber at a pressure in excess of ambient pressure, when the first chamber is liquid filled and expanded by piston displacement toward the second chamber and said first and second valve controlled means are closed, with the pressure of the gas supplied to the second chamber acting on the relatively large second area to raise the pressure of the liquid in the first chamber acting on the relatively small first area to a value in excess of the pressure in the second chamber, whereby liquid passes through the restricted passageway means from the first chamber to be introduced directly into gas contained in the second chamber with concurrent movement of the piston toward the first chamber.

2. The combination of claim 1, wherein said restricted passageway comprises a plurality of spaced passageways through the piston, each having a restricted orifice adjacent the second chamber side of the piston, whereby liquid passing therethrough is sprayed into the second chamber immediately adjacent the piston.

3. The combination of claim 1, including a pressure-responsive valve means normally-closing said passageway means that opens in response to the pressure within the second chamber exceeding pressure ambient to the end of said piston rod means remote from the piston by a predetermined amount.

4. The combination of claim 1, wherein said first valve controlled means comprises said cylinder being provided with an outlet conduit surrounded by a first valve seat means, a first valve means normally seated against said first valve seat means and closing said outlet conduit, said first valve means being comprised of a tubular member having a radially extending flange carried thereon, said tubular member having an opening therethrough communicating between the second chamber and the outlet conduit, a second valve seat means in the tubular member, a second valve means in the opening through the tubular member normally seated against the second valve seat means and closing the opening through the tubular member, said tubular member being disposed in the cylinder and in alignment with the piston rod means, said piston and piston rod means having an opening therein aligned with and loosely receiving the tubular member, and a common valve actuator means for sequentially opening said second and first valve means, whereby gas in the second chamber can be vented through the tubular member prior to discharge of the remaining contents of the second chamber through the outlet conduit about the tubular member.

5. The combination of claim 1, wherein the valve controlled means for discharging the second chamber includes an outlet conduit surrounded by valve seat means, valve means for said valve seat means to close the outlet conduit, a spring means biasing said valve means toward the piston and from said valve seat means to maintain the outlet conduit normally open, a valve actuator carried by the piston on the second chamber side thereof, said valve means being disposed in the travel path of the valve actuator, whereby the valve means is engaged by the latter and urged to outlet conduit closing position during travel of the piston toward the second chamber and when closed will remain closed as long as the pressure in the second chamber acting on the valve means is sufficient to overcome the bias of the spring means.

6. The combination of claim 1, including means responsive to movement of the piston rod means for initiating and terminating operation of the third valve controlled means to supply gas to the second chamber respectively upon the piston moving to a position adjacent the second chamber end of the cylinder and moving to a position adjacent the first chamber end of the cylinder, and said second valve controlled means including a check valve.

7. The combination of claim 1, wherein the cylinder is disposed vertically with the first chamber end thereof uppermost, said second valve controlled means to supply liquid to the first chamber comprising a hopper of predetermined capacity for liquid mounted on the top of the cylinder, a vertical passageway means for liquid communicating between the bottom of the hopper and the top of the first chamber, a manually actuable valve means adjacent the top of the first chamber normally closing the vertical passageway means whereby a predetermined quantity of liquid can be placed in the hopper and thereafter introduced into the first chamber on manual actuation of the valve means.

8. Water carbonating apparatus of the type including sources of liquid water and carbon dioxide gas under super-atmospheric pressure in combination with a closed cylinder having rod and head ends, a piston reciprocably mounted in said cylinder and separating the interior of the cylinder into a head end chamber and a rod end chamber, a passageway in the piston extending between the chambers, hollow piston rod means mounted in said passageway of said piston to move therewith and relative thereto and extending through the rod end of said cylinder, the arrangement being such that the piston presents a relatively large effective area to the head end chamber and a relatively small effective area to the rod end chamber, said piston rod means being of lesser external extent than said passageway in the piston to define therewith an annular passageway communicating between said rod and head end chambers; said hollow piston rod means providing communication between the exterior of the cylinder and the head end chamber through the first-mentioned passageway through which the head end chamber can be vented to the atmosphere, an outlet conduit in the head end of said cylinder, a first valve seat means surrounding the outlet conduit, a first valve means for seating against the first valve seat means to close the outlet conduit, a first spring means biasing said first valve means from the first valve seat means and toward the piston to open the outlet conduit, carbon dioxide conduit means communicating between said source of carbon dioxide and the head end chamber, gas-inlet valve means for said carbon dioxide conduit means actuable to control introduction of carbon dioxide gas into the head end chamber, water conduit means communicating between said source of water and the rod end chamber with check valve means for preventing flow of water from such chamber to such source, spray nozzle means carried by the piston in communication with the first-mentioned passageway for spraying water passing through such passageway into the head end chamber, means carried by the piston having a travel path therewith to engage the first valve means and seat the latter against the first valve seat means on piston travel toward the head end of the cylinder, a second valve seat means formed in and surrounding the first-mentioned passageway, said piston rod means including a second valve means at the piston end thereof for seating against the second valve seat means to close the first-mentioned passageway against communication between said chambers, a second spring means carried by the piston biasing the hollow piston rod means from the rod end of the cylinder toward the piston to normally seat the second valve means against the second valve seat means and close communication between said chambers through the first-mentioned passageway, a third valve seat means formed in the hollow piston rod means, a third valve means in the hollow piston rod means for seating against the third valve seat means to close communication between the head end chamber and the atmosphere through the hollow piston rod means, a valve stem connected to the third valve means and projecting from the end of the piston rod means remote from the piston, a third spring means biasing the third valve means into seating engagement with the third valve seat means, whereby a cycle of operation of the apparatus comprises the rod end chamber being water filled and the piston disposed adjacent the head end of the cylinder closing the outlet conduit, carbon dioxide being introduced into the head end chamber under pressure to maintain the outlet conduit closed and to act against a relatively larger effective area of the piston to raise the pressure of the water in the rod end chamber acting against the relatively smaller effective area of the piston above the pressure in the head end chamber to close the check valve means and to unseat the second valve means against the bias of the second spring means whereupon water passes from the rod end chamber to the head end chamber and is sprayed into the latter through the nozzle means with concurrent movement of the piston toward the rod end of the cylinder, then the introduction of carbon dioxide is discontinued on the piston being disposed adjacent the rod end of the cylinder whereupon the valve stem is actuated to open the third valve means for a sufficient period to vent gas from the head end chamber to atmospheric pressure so that the second valve means closes and the first valve means opens the outlet conduit with the result that the contents of the head end chamber are discharged through the outlet conduit accompanied by piston movement toward the head end chamber and filling of the rod end chamber with water until the means carried by the piston closes the first valve means to complete a cycle.

9. The combination of claim 8, wherein the means carried by the piston for closing the first valve means is a spring.

10. The water carbonating apparatus of claim 8, wherein an upright member is mounted on said rod end of said cylinder, said upright member having an arm mounted thereon disposed in the travel path of the projecting end of the valve stem, a second arm member mounted on said piston rod means external of said cylinder to move therewith in operation, a valve operator means pivotally mounted on said rod end of said cylinder in the travel path of the second arm member and connected to said gas-inlet valve means of said carbon dioxide conduit means to open said gas-inlet valve upon retraction of said piston rod means into the cylinder and engagement thereof by the second arm member to introduce carbon dioxide into said head end chamber of said cylinder, and means attached to said piston rod means and said valve operator means to urge said gas-inlet valve means into closed position when said piston rod means is extended from the cylinder.

11. The apparatus of claim 10, wherein said outlet conduit is connected to a storage tank for carbonated water, a fourth valve means for controlling the supply of carbon dioxide gas to the carbon dioxide conduit means, float means in the storage tank connected to the fourth valve means for shutting off the supply of carbon dioxide gas when the liquid level in the storage tank exceeds a predetermined height, and a valve controlled liquid discharge means for the storage tank.

References Cited in the file of this patent

UNITED STATES PATENTS

| 523,951 | Van Fleet | July 31, 1894 |
| 2,604,310 | Brown | July 22, 1952 |
| 2,643,866 | Kallsman | June 30, 1953 |
| 2,685,952 | Hamlin et al. | Apr. 10, 1954 |

FOREIGN PATENTS

| 20,478 | Great Britain | Sept. 15, 1894 |
| 25,501 | Great Britain | Nov. 26, 1909 |